(12) United States Patent
Maak et al.

(10) Patent No.: US 8,287,949 B2
(45) Date of Patent: Oct. 16, 2012

(54) AQUEOUS DISPERSIONS

(75) Inventors: Kevin D. Maak, Midland, MI (US); Selim Yalvac, Pearland, TX (US); Mike J. Levinson, Midland, MI (US); Dale C. Schmidt, Midland, MI (US); Brad Maurice Moncla, Lake Jackson, TX (US); Matthew James Kalinowski, Freeland, MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 11/481,670

(22) Filed: Jul. 6, 2006

(65) Prior Publication Data

US 2007/0160833 A1    Jul. 12, 2007

Related U.S. Application Data

(60) Provisional application No. 60/697,087, filed on Jul. 7, 2005.

(51) Int. Cl.
*B05D 5/10* (2006.01)

(52) U.S. Cl. ............. 427/207.1; 427/365; 427/366; 427/369; 427/370; 427/384; 427/385.5

(58) Field of Classification Search ........... 427/207.1, 427/208.2, 208.4; 524/522, 523
See application file for complete search history.

(56) References Cited

U.S. PATENT DOCUMENTS

| | | | |
|---|---|---|---|
| 3,645,992 A | 2/1972 | Elston | |
| 4,076,698 A | 2/1978 | Anderson et al. | |
| 4,599,392 A | 7/1986 | McKinney et al. | |
| 4,762,890 A | 8/1988 | Strait et al. | |
| 4,927,888 A | 5/1990 | Strait et al. | |
| 4,950,541 A | 8/1990 | Tabor et al. | |
| 4,988,781 A | 1/1991 | McKinney et al. | |
| 5,272,236 A | 12/1993 | Lai et al. | |
| 5,278,272 A | 1/1994 | Lai et al. | |
| 5,322,731 A * | 6/1994 | Callahan et al. | ............ 428/327 |
| 5,677,383 A | 10/1997 | Chum et al. | |
| 5,756,659 A | 5/1998 | Hughes et al. | |
| 5,844,045 A | 12/1998 | Kolthammer et al. | |
| 5,869,575 A | 2/1999 | Kolthammer et al. | |

(Continued)

FOREIGN PATENT DOCUMENTS

EP    1293261 A2 *   3/2003

(Continued)

OTHER PUBLICATIONS

PCT Notification of Transmittal of the International Search Report and the Written Opinion of the International Searching Authority, or the Declaration; PCT/US2006/026285; dated Oct. 31, 2007; 14 pages.

(Continued)

*Primary Examiner* — Erma Cameron

(57) ABSTRACT

A method and composition for forming an adhesive bond is described. The method includes depositing an aqueous dispersion on a substrate to form a selectively activatable coating, the aqueous dispersion including (A) a polymer capable of forming an adhesive, (B) at least one dispersing agent; and (C) at least one of a tackifying resin, a wax, or an oil wherein the dispersion has at least one of an average particle size of from about 0.1 to about 100 microns and a polydispersity of less than 5; and selectively activating at least a portion of the coated substrate to form the adhesive bond.

4 Claims, 2 Drawing Sheets

U.S. PATENT DOCUMENTS

| | | | |
|---|---|---|---|
| 5,938,437 | A | 8/1999 | DeVincenzo |
| 6,111,023 | A | 8/2000 | Chum et al. |
| 6,268,444 | B1 | 7/2001 | Klosin et al. |
| 6,281,298 | B1 * | 8/2001 | Papsin, Jr. ............... 525/419 |
| 6,316,088 | B1 | 11/2001 | Ogawa |
| 6,316,549 | B1 | 11/2001 | Chum et al. |
| 6,448,341 | B1 | 9/2002 | Kolthammer et al. |
| 6,538,070 | B1 | 3/2003 | Cardwell et al. |
| 6,548,579 | B2 | 4/2003 | Reski et al. |
| 6,566,446 | B1 | 5/2003 | Parikh et al. |
| 6,593,005 | B2 | 7/2003 | Tau et al. |
| 6,777,096 | B2 * | 8/2004 | Shiba et al. .............. 428/322.2 |
| 6,825,295 | B2 | 11/2004 | Klosin et al. |
| 6,884,840 | B2 | 4/2005 | Gleichenhagen et al. |
| 6,897,276 | B2 | 5/2005 | Boussie et al. |
| 6,953,764 | B2 | 10/2005 | Frazier et al. |
| 6,960,635 | B2 | 11/2005 | Stevens et al. |
| 2001/0011118 | A1 | 8/2001 | Sanada |
| 2001/0034394 | A1 * | 10/2001 | Gleichenhagen et al. .... 524/272 |
| 2003/0211280 | A1 * | 11/2003 | Brumbelow et al. ........... 428/97 |
| 2004/0047985 | A1 * | 3/2004 | Storbeck et al. ........... 427/207.1 |
| 2005/0100754 | A1 * | 5/2005 | Moncla et al. ................ 428/523 |

FOREIGN PATENT DOCUMENTS

| | | | |
|---|---|---|---|
| JP | 05105791 | A * | 4/1993 |
| JP | 2001207146 | A | 7/2001 |
| JP | 2005082606 | A | 3/2005 |
| WO | WO-03/040195 | A1 | 5/2003 |
| WO | WO-2004/024740 | A1 | 3/2004 |
| WO | 2005/090425 | | 9/2005 |
| WO | 2005/090426 | | 9/2005 |
| WO | 2005/090427 | | 9/2005 |
| WO | 2005085331 | A1 | 9/2005 |

OTHER PUBLICATIONS

International Application No. PCT/US2006/026285; International Search Report dated Sep. 6, 2007 (4 pages).
European Patent Office Communication Pursuant to Article 94(3) EPC; ACH/P96687EP00; dated Apr. 28, 2008; 6 pages.
Taiwan Patent Office Official Communication for related Application 095124815; dated Sep. 3, 2009 (3 pages).
Search Report of R.O.C Patent Application No. 095124815 w/English translation; dated Aug. 31, 2009 (2 pages).
esp@cenet Patent Abstract for Japanese Publication No. 2001207146, publication date Jul. 31, 2001. (1 page).
Australian Patent Office Official Communication for related Application 2006269469; dated Sep. 4, 2009 (3 pages).
Korean Notice of Preliminary Rejection for corresponding Korean Application No. 10-2008-7003114 dated Nov. 20, 2009. (8 pages).
Text of First Office Action issued in corresponding Chinese Patent Application No. 200680028598.9.
Translation of Office Action from Chinese Patent Office for counterpart Chinese Patent Application No. 200680028598.9, dated Feb. 1, 2012, 1 page.
Japanese Office Action dated May 31, 2011 with translation for counterpart Japanese Application No. 2008-520377, 3 pages.
Response to Canadian Office Action dated Oct. 19, 2010 for counterpart Canadian Application No. 2,614,309, 25 pages.
Chinese Office Action dated Feb. 25, 2011 with translation for counterpart Chinese Application No. 200680028598.9, 3 pages.
Canadian Office Action dated Oct. 19, 2010 for counterpart Canadian Application No. 2,614,309, 4 pages.
Response to Australian Office Action dated Apr. 12, 2010 for counterpart Australian Application No. 2006269469, 21 pages.
Argentine Office Action dated Feb. 23, 2009 with translation for counterpart Argentine Application No. 060102945, 4 pages.
Response to European Office Action dated Nov. 8, 2008 for counterpart European Application No. 06786442.1, 49 pages.
Response to Argentine Office Action for counterpart Argentine Application No. 060102945, dated Apr. 29, 2009, 3 pages.
Response to Chinese Office Action for counterpart Chinese Application No. 200680028598.9, dated Jun. 3, 2010, 10 pages.
Response to Korean Office Action for counterpart Korean Application No. 10-2008-7003114, dated Jan. 13, 2010, 5 pages.
Response to Taiwanese Office Action for counterpart Taiwanese Application No. 95124815, dated Nov. 30, 2009, 9 pages.
Response to Japanese OA for counterpart Chinese Application No. 2008-520377 dated May 31, 2011, 2 pages.
Response to Office Action filed on Mar. 7, 2012 in counterpart Chinese Patent Application No. 200680028598.9.
Japanese Final Office Action dated Mar. 6, 2012 for counterpart Japanese Application No. JP 2008-520377.
Chinese Office Action dated May 24, 2012 for counterpart Chinese Application No. 200680028598.9.
Instructions to JP foreign associate dated May 1, 2012; from counterpart JP Application No. 2008-5200377.
JP Response to Office Action, dated May 31, 2012; from counterpart JP Application No. 2008-5200377.
Instructions to CN foreign associate, dated Jun. 25, 2012; from counterpart CN Application No. 200610028598.9.
CN proposed amendments dated Jun. 27, 2012, from counterpart CN Application No. 2006/0028598.9.
CN Response to Office Action dated Jul. 18, 2012; from counterpart CN Application No. 2006/0028598.9.
Chinese Response to Office Action dated Aug. 23, 2012; from counterpart Chinese application No. 200680028598.9.

* cited by examiner

AQUEOUS DISPERSIONS

CROSS-REFERENCE TO RELATED APPLICATIONS

This application claims priority, pursuant to 35 U.S.C. §119(e) to U.S. Provisional Application No. 60/697,087, which is incorporated by reference in its entirety.

BACKGROUND OF INVENTION

Adhesives are widely used for various commercial applications such as product assembly and packaging. Two specific types of adhesives are known as pressure sensitive adhesives (PSAs) and hot melt adhesives (HMAs). PSAs are a distinct category of adhesive, which, in dry (solvent free) form, are aggressive and permanently tacky at room temperature and adhere to a variety of surfaces without the need of more than pressure. They do not require activation by water, solvent, or heat. In contrast, HMAs are typically applied to a substrate while in its molten state and cooled to harden the adhesive layer.

Most commercially available HMAs require temperatures of 175° C. or greater to ensure complete melting of all the components and also to achieve a satisfactory application viscosity. While adhesive formulations that can be applied at temperatures below 150° C. can be prepared using low molecular weight components or a high wax content, application viscosity and adhesive properties suffer. While softer or more amorphous components may be added in order to improve adhesion, these components reduce the effective heat resistance.

The use of a HMA with high heat resistance and, in addition, good cold resistance is important in hot filled packaging applications, e.g., sealing and closing operations for cartons, cases or trays used for packaging molten cheese, yogurt or freshly baked goods, which are subsequently subjected to refrigeration or freezing.

PSAs have been used in a variety of applications, as they provide many desirable characteristics such as removability and ease of application. For a more permanent and highly smooth bond, some conventional PSAs may not necessarily have sufficient strength to hold and maintain their adherence on certain substrates. Furthermore, conventional PSA when applied to certain materials, may not be able to withstand exposure to elevated temperatures or high humidity. For example, application of a PSA on acrylic sheets and polycarbonate sheets, known to be "outgassing materials" and difficult to bond, can result in bubbling and delamination.

Curable adhesives (e.g., heat or light-cured) have been used in applications where substrates require substantial permanency and high strength adherence. For optical product applications (e.g., glazings), curable adhesives have been desirable, as they can provide optically clear, strongly adhered laminates (e.g., layered substrates). In addition, paper manufacturers and print manufacturers use PSAs in bookbinding applications, for example.

To achieve both strength and ease of application, hybrid compositions have been developed that can be used in optical applications. For example, a light curable, polyester-based adhesive has been used for plastic glazing applications. In digital video disc (DVD or optical discs) bonding and CRT applications, a liquid adhesive formulation has been used. For bead bonding in making retroreflective articles, a curable polymeric network has been suggested.

Strength and application, however, are not the only criteria that many optical substrates/laminates require. Certain optical products are exposed to harsh environmental conditions, such as heat, UV (solar) light, water, etc. For example, vehicle windshields generally exist in outdoor conditions that submit them to all types of weather. These windshields typically include substrates such as acrylic or polycarbonate, adhered to a solar or infra-red (IR) reflecting film made from a multi-layer optical film (MLOF) (3M Co; St. Paul, Minn.). The materials may become optically obstructed if the adhesion between the layers is damaged or compromised.

One prior art method film-forming polymer and a particulate thermoplastic component selected from the group consisting of thermoplastic polymers, thermoplastic resins, hot melt adhesive compositions, and mixtures thereof is disclosed in U.S. Pat. No. 6,548,579. The thermoplastic component has a mean particle size of from about 10 microns to about 1,500 microns. There continues to be a need in the art for improved adhesives that can be applied at low temperatures, to a variety of substrates, and under a variety of environmental conditions.

SUMMARY OF INVENTION

In one aspect, the present invention relates to a method for forming an adhesive bond that includes depositing an aqueous dispersion on a substrate to form a selectively activatable coating, the aqueous dispersion including (A) a polymer capable of forming an adhesive; (B) at least one dispersing agent; and (C) at least one of a tackifying resin, a wax, or an oil, wherein the dispersion has at least one of an average particle size of from about 0.1 to about 100 microns and a polydispersity of less than 5; and selectively activating at least a portion of the coated substrate to form the adhesive bond.

In another aspect, the present invention relates to an aqueous hot melt adhesive dispersion, that includes (A) a polymer capable of forming an adhesive; (B) at least one of a tackifying resin, a wax, or an oil; (C) a dispersing agent; and (D) water, wherein the dispersion has at least one of an average particle size of from about 0.1 to about 100 microns and a polydispersity of less than 5.

In another aspect, the present invention relates to an aqueous pressure sensitive adhesive, that includes (A) a polymer capable of forming an adhesive, the polymer being at least one selected from the group consisting of propylene-based copolymers and homopolymers, and styrene-based copolymers and block copolymers; (B) at least one dispersing agent; (C) at least one of a tackifying resin, a wax, or an oil; and (D) water, wherein the dispersion has at least one of an average particle size of from about 0.1 to about 100 microns and a polydispersity of less than 5.

Other aspects and advantages of the invention will be apparent from the following description and the appended claims.

DETAILED DESCRIPTION

Figure 1:
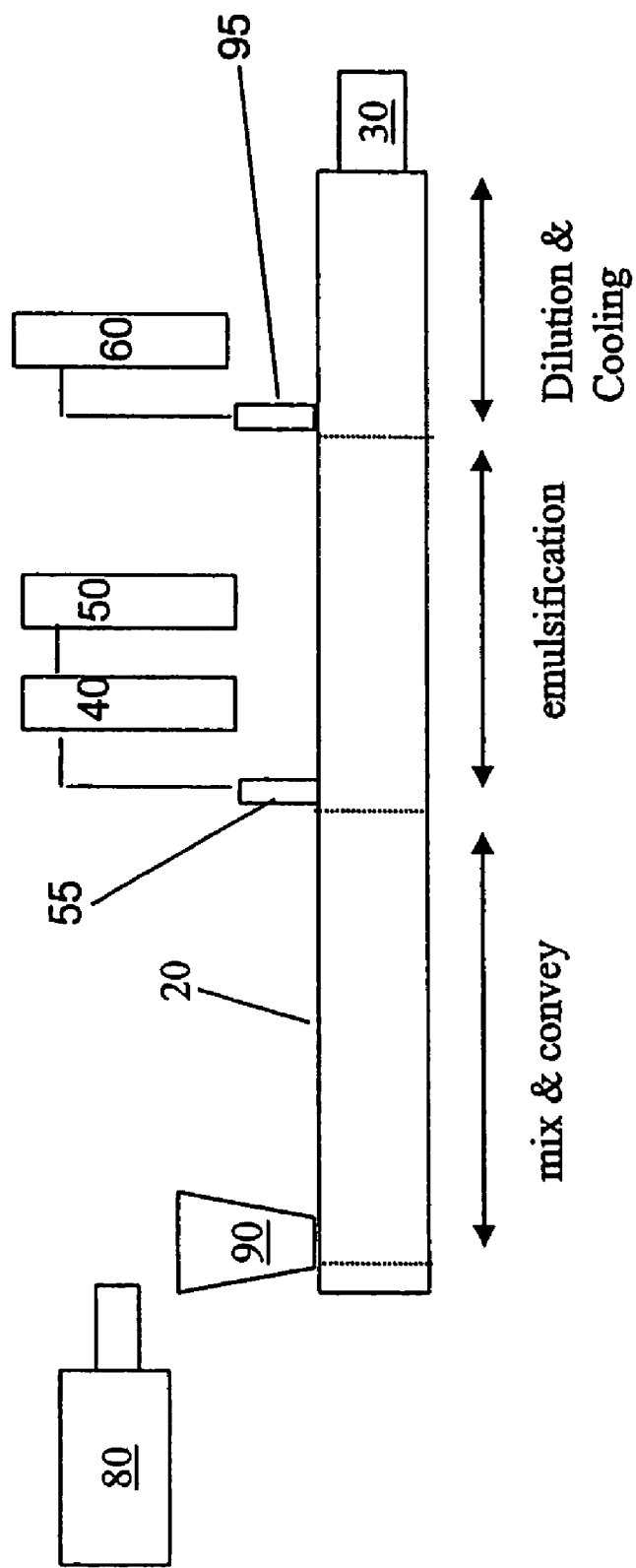
FIG. 1 shows an exemplary apparatus suitable for forming dispersions in accordance with embodiments of the present invention.

Aspects of the present invention relate to adhesive compositions that may be applied to a number of different "hard to bond" substrates, such as wood, clay-coated cardboards, polyolefinic films, as well as other, relatively easier to bond substrates. In particular, embodiments of the present invention relate to methods of selectively forming adhesive bonds and coating substrates using aqueous dispersions that include a polymer capable of forming an adhesive compound, at least one tackifying resin, wax, or oil, and a dispersing agent. The specific types of polymers, tackifying resins, waxes, or oils, and/or dispersing agents used are not limited, so long as they are capable of forming an adhesive composition.

As used herein, the term "adhesive" refers to a substance or composition that may be used to bond two substrates together by adhering or bonding to the surfaces of each.

In other words, by using the compositions and methods in accordance with embodiments of the present invention, dispersions that contain the precursors to form an adhesive composition are created. Significantly, the activatable coatings may be activated (in the case of a HMA through the application of heat, or in the case of a PSA through the application of pressure) at a later time. This means that the precursor dispersion may be stored (as an aqueous solution, for example) or, alternatively, the dispersion may be deposited onto a substrate and shipped as an unactivated (but potentially dry) coating on the substrate. Significantly, the activatable coatings may be activated (in the case of a HMA through the application of heat, or in the case of a PSA through the application of pressure) at a later time and/or at the specific substrate location where bonding is desired. Selectively activatable means that the bond may be formed at a later time and/or only in the locations where sufficient heat and/or pressure is applied to achieve a bond.

The formulated adhesives may be used in the following representative applications: bookbinding, case and/or carton sealing, general packaging, appliances, doors and millwork, hygiene, diapers, shoes, and furniture. Additional uses of adhesives include, but are not limited to, carpet seam sealing tape, lamination, product assembly, nonwoven construction, and potting and encapsulation compounds.

Embodiments of the aqueous dispersions described herein contain water in addition to the components described below. The term "dispersion" as used herein refers to a finely divided solid or liquid in a continuous liquid medium. An aqueous dispersion is a dispersion in which the continuous liquid medium is water. As mentioned above, embodiments of the present invention relate to aqueous dispersions and adhesive compositions made from those dispersions that include a polymer capable of forming an adhesive compound, at least one tackifying resin, wax, or oil, and a dispersing agent. Those having ordinary skill in the art will appreciate that multiple components from each of these groups may be used.

Polymers:

A number of different polymers may be used as the base component of dispersions and adhesives in accordance with embodiments of the present invention. For example, ethylene vinyl acetate (EVA) based polymers may be used. The type and amount of wax and resin used with the EVA copolymer can control the set time and the residual tack of the adhesive. In some instances, filler may be added to EVA adhesives for special applications. Other embodiments of the present invention may use ethylene-based polymers, propylene-based polymers, such as VERSIFY™ (available from The Dow Chemical Company, Midland, Mich.) or VISTAMAXX™ (available from Exxon-Mobil, Inc. Houston, Tex.), propylene-ethylene copolymers, amorphous poly alpha-olefins, polyamides, block copolymers, and/or other polymers known in the art.

Other polymers may include, for example, ethylene ethyl acrylate (EEA), ethylene acrylic acid (EAA), one example of which is commercially sold as PRIMACOR™ (available from The Dow Chemical Company, Midland, Mich.), or ethylene-methacrylic acid copolymers, such as those available under the names NUCREL™ (trademark of E.I. DuPont de Nemours), and ESCOR™ (trademark of ExxonMobil) and described in U.S. Pat. Nos. 4,599,392, 4,988,781, and 5,938,437, each of which is incorporated herein by reference in its entirety. Ionomers of EAA and EMA are also expressly incorporated, one example of which is SURLYN™ (trademark of E.I. DuPont de Nemours). Other polymers include ethylene ethyl acrylate (EEA) copolymer, ethylene methyl methacrylate (EMMA), ethylene butyl acrylate (EBA), styrene-isoprene-styrene copolymers, styrene-butadiene-styrene copolymers, as well as a number of other styrene copolymers (SEBS, SEPS, etc.), polyurethane polyvinyl chloride, latex nitrile, acrylonitrile copolymers, acrylics (including pure acrylics as well as styrene acrylics and vinyl acrylics), and polyisobutylene. In addition, polymers such as ethylene butyl acrylate (EnBA) and epoxydized polybutadiene (PBE) may be used. Synthetic polymers are used with some embodiments of the present invention.

Moreover, it will be appreciated that modified polymers may be used, for example, grafted, cross-linked or other modifications can be made to the polymers disclosed above and below in embodiments of the present invention. Bis(sulfonyl)azide, for example, may be used as a cross-linking agent, in accordance with the techniques set forth in U.S. Pat. No. 6,593,005, which is incorporated by reference in its entirety. Other examples include low density polyethylene grafted with maleic anhydride (MAH), maleic anhydride-grafted polypropylene, or combinations thereof. Also, specific embodiments of the present invention may use polymers that do not contain hydrolysable groups ("non-hydrolyzable polymers").

A non-comprehensive listing of suitable polymers includes homopolymers and copolymers (including elastomers) of an alpha-olefin such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene, as typically represented by ethylene-butadiene copolymer and ethylene-ethylidene norbornene copolymer; and polyolefins (including elastomers) such as copolymers of two or more alpha-olefins with a conjugated or non-conjugated diene, as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth)acrylic acid copolymers, and ethylene-(meth)acrylate copolymer; styrenic copolymers (including elastomers) such as polystyrene, ABS, acrylonitrile-styrene copolymer, α-methylstyrene-styrene copolymer, styrene vinyl alcohol, styrene acrylates such as styrene methylacrylate, styrene butyl acrylate, styrene butyl methacrylate, and styrene butadienes and crosslinked styrene polymers; and styrene block copolymers (including elastomers) such as styrene-butadiene copolymer and hydrates thereof, and styrene-isoprene-styrene triblock copolymer; polyvinyl compounds such as polyvinyl chloride, polyvinylidene chloride, vinyl chloride-vinylidene chloride copolymer, polymethyl acrylate, and polymethyl methacrylate; polyamides such as nylon 6, nylon 6,6, and nylon 12; thermoplastic polyesters such as polyethylene terephthalate and polybutylene terephthalate; polycarbonate, polyphenylene oxide, and the like; and glassy hydrocarbon-based resins, including poly-dicyclopentadiene polymers and related polymers (copolymers, terpolymers); saturated mono-olefins such as vinyl acetate, vinyl propionate and vinyl butyrate and the like; vinyl esters such as esters of monocarboxylic acids, including methyl acrylate, ethyl acrylate, n-butylacrylate, isobutyl acrylate, dodecyl acrylate, n-octyl acrylate, phenyl acrylate, methyl methacrylate, ethyl methacrylate, and butyl methacrylate and the like; acrylonitrile, methacrylonitrile, acrylamide, and mixtures thereof; and resins produced by ring opening metathesis and cross metathesis polymerization and the like. These resins may be used either alone or in combinations of two or more.

In some embodiments, one or more of the base polymers in the dispersion may comprise a class of ethylene/α-olefin block interpolymers (hereinafter "block interpolymer", "ethylene/α-olefin interpolymers", or variations thereof) invented by the assignee of the present invention. These polymers have been disclosed in at least U.S. Provisional Application No. 60/553,906, filed Mar. 17, 2004; U.S. Provisional Application No. 60/662,937, filed Mar. 17, 2005; U.S. Provisional Application No. 60/662,939, filed Mar. 17, 2005; U.S. Provisional Application No. 60/566,2938, filed Mar. 17, 2005; PCT Application No. PCT/US2005/008916, filed Mar. 17, 2005; PCT Application No. PCT/US2005/008915, filed Mar. 17, 2005; and PCT Application No. PCT/US2005/008917, filed Mar. 17, 2005, all of which are incorporated by reference herein in their entirety.

The ethylene/α-olefin interpolymers comprise ethylene and one or more copolymerizable α-olefin comonomers in polymerized form, characterized by multiple (i.e., two or more) blocks or segments of two or more polymerized monomer units differing in chemical or physical properties (block interpolymer), preferably a multi-block copolymer. In some embodiments, the multi-block copolymer can be represented by the following formula:

$$(AB)_n$$

where n is at least 1, preferably an integer greater than 1, such as 2, 3, 4, 5, 10, 15, 20, 30, 40, 50, 60, 70, 80, 90, 100, or higher; "A" represents a hard block or segment; and "B" represents a soft block or segment. Preferably, As and Bs are linked in a linear fashion, not in a branched or a star fashion. "Hard" segments refer to blocks of polymerized units in which ethylene is present in an amount greater than 95 weight percent in some embodiments, and in other embodiments greater than 98 weight percent. In other words, the comonomer content in the hard segments is less than 5 weight percent in some embodiments, and in other embodiments, less than 2 weight percent of the total weight of the hard segments. In some embodiments, the hard segments comprises all or substantially all ethylene. "Soft" segments, on the other hand, refer to blocks of polymerized units in which the comonomer content is greater than 5 weight percent of the total weight of the soft segments in some embodiments, greater than 8 weight percent, greater than 10 weight percent, or greater than 15 weight percent in various other embodiments. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent in various other embodiments.

In some embodiments, A blocks and B blocks are randomly distributed along the polymer chain. In other words, the block copolymers do not have a structure like:

AAA-AA-BBB-BB

In other embodiments, the block copolymers do not have a third block. In still other embodiments, neither block A nor block B comprises two or more segments (or sub-blocks), such as a tip segment.

The ethylene/α-olefin interpolymers are characterized by an average block index, ABI, ranging from greater than zero to about 1.0 and a molecular weight distribution, $M_w/M_n$, greater than about 1.3. The average block index, ABI, is the weight average of the block index ("BI") for each of the polymer fractions obtained in preparative temperature rising elution fractionation (TREF) from 20° C. and 110° C., with an increment of 5° C.:

$$ABI = \Sigma(w_i BI_i)$$

where $BI_i$ is the block index for the ith fraction of the block ethylene/α-olefin interpolymer obtained in preparative TREF, and $w_i$ is the weight percentage of the ith fraction.

Similarly, the square root of the second moment about the mean, hereinafter referred to as the second moment weight average block index, can be defined as follows.

$2^{nd}$ moment weight average $$BI = \sqrt{\frac{\Sigma(w_i(BI_i - ABI)^2)}{\frac{(N-1)\Sigma w_i}{N}}}$$

For each polymer fraction, BI is defined by one of the two following equations (both of which give the same BI value):

$$BI = \frac{1/T_X - 1/T_{XO}}{1/T_A - 1/T_{AB}} \text{ or } BI = -\frac{\text{Ln}P_X - \text{Ln}P_{XO}}{\text{Ln}P_A - \text{Ln}P_{AB}}$$

where $T_X$ is the analytical temperature rising elution fractionation (ATREF) elution temperature for the ith fraction (preferably expressed in Kelvin), $P_X$ is the ethylene mole fraction for the ith fraction, which can be measured by NMR or IR as described below. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As an approximation or for polymers where the "hard segment" composition is unknown, the $T_A$ and $P_A$ values are set to those for high density polyethylene homopolymer.

$T_{AB}$ is the ATREF elution temperature for a random copolymer of the same composition (having an ethylene mole fraction of $P_{AB}$) and molecular weight as the block copolymer. $T_{AB}$ can be calculated from the mole fraction of ethylene (measured by NMR) using the following equation:

$$\text{Ln } P_{AB} = \alpha/T_{AB} + \beta$$

where α and β are two constants which can be determined by a calibration using a number of well characterized preparative TREF fractions of a broad composition random copolymer and/or well characterized random ethylene copolymers with narrow composition. It should be noted that α and β may vary from instrument to instrument. Moreover, one would need to create an appropriate calibration curve with the polymer composition of interest, using appropriate molecular weight ranges and comonomer type for the preparative TREF fractions and/or random copolymers used to create the calibration. There is a slight molecular weight effect. If the calibration curve is obtained from similar molecular weight ranges, such effect would be essentially negligible. In some embodiments, random ethylene copolymers and/or preparative TREF fractions of random copolymers satisfy the following relationship:

$$\text{Ln } P = -237.83/T_{ATREF} + 0.639.$$

The above calibration equation relates the mole fraction of ethylene, P, to the analytical TREF elution temperature, $T_{ATREF}$, for narrow composition random copolymers and/or preparative TREF fractions of broad composition random copolymers. $T_{XO}$ is the ATREF temperature for a random copolymer of the same composition and having an ethylene mole fraction of $P_X$. $T_{XO}$ can be calculated from $\text{Ln } P_X = \alpha/T_{XO} + \beta$. Conversely, $P_{XO}$ is the ethylene mole fraction for a random copolymer of the same composition and having an ATREF temperature of $T_X$, which can be calculated from $\text{Ln } P_{XO} = \alpha/T_X + \beta$.

Once the block index (BI) for each preparative TREF fraction is obtained, the weight average block index, ABI, for the whole polymer can be calculated. In some embodiments, ABI is greater than zero but less than about 0.4 or from about 0.1 to about 0.3. In other embodiments, ABI is greater than about 0.4 and up to about 1.0. In other embodiments, ABI may be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the ethylene/α-olefin block interpolymer is that the ethylene/α-olefin block interpolymer comprises at least one polymer fraction which can be obtained by preparative TREF, wherein the fraction has a block index greater than about 0.1 and up to about 1.0 and the polymer having a molecular weight distribution, $M_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

In addition to an average block index and individual fraction block indices, the ethylene/α-olefin interpolymers are characterized by one or more of the properties described as follows.

In one aspect, the ethylene/α-olefin interpolymers used in embodiments of the invention have a $M_w/M_n$ from about 1.7 to about 3.5 and at least one melting point, $T_m$, in degrees Celsius, and density, d, in grams/cubic centimeter, wherein the numerical values of the variables correspond to the relationship:

$$T_m > -2002.9 + 4538.5(d) - 2422.2(d)^2 \text{ in some embodiments;}$$

$$T_m \geq -6288.1 + 13141(d) - 6720.3(d)^2 \text{ in other embodiments; and}$$

$$T_m \geq 858.91 - 1825.3(d) + 1112.8(d)^2 \text{ in yet other embodiments.}$$

Unlike the traditional random copolymers of ethylene/α-olefins whose melting points decrease with decreasing densities, the block interpolymers exhibit melting points substantially independent of the density, particularly when density is between about 0.87 g/cc to about 0.95 g/cc. For example, the melting point of such polymers may be in the range of about 110° C. to about 130° C. when density ranges from 0.875 g/cc to about 0.945 g/cc. In some embodiments, the melting point of such polymers may be in the range of about 115° C. to about 125° C. when density ranges from 0.875 g/cc to about 0.945 g/cc.

In another aspect, the ethylene/α-olefin interpolymers comprise, in polymerized form, ethylene and one or more α-olefins and are characterized by a ΔT, in degree Celsius, defined as the temperature for the tallest Differential Scanning Calorimetry ("DSC") peak minus the temperature for the tallest Crystallization Analysis Fractionation ("CRYSTAF") peak and a heat of fusion in J/g, ΔH, and ΔT and ΔH satisfy the following relationships:

$$\Delta T > -0.1299(\Delta H) + 62.81 \text{ in some embodiments;}$$

$$\Delta T \geq -0.1299(\Delta H) + 64.38 \text{ in other embodiments; and}$$

$$\Delta T \geq -0.1299(\Delta H) + 65.95 \text{ in yet other embodiments;}$$

for ΔH up to 130 J/g. Moreover, ΔT is equal to or greater than 48° C. for ΔH greater than 130 J/g. The CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C., and ΔH is the numerical value of the heat of fusion in J/g. More preferably, the highest CRYSTAF peak contains at least 10 percent of the cumulative polymer.

In yet another aspect, the ethylene/α-olefin interpolymers have a molecular fraction which elutes between 40° C. and 130° C. when fractionated using Temperature Rising Elution Fractionation ("TREF"), characterized in that said fraction has a molar comonomer content higher, at least 5 percent higher in some embodiments, at least 10 percent higher in other embodiments, than that of a comparable random ethylene interpolymer fraction eluting between the same temperatures, wherein the comparable random ethylene interpolymer contains the same comonomer(s), and has a melt index, density, and molar comonomer content (based on the whole polymer) within 10 percent of that of the block interpolymer. In some embodiments, the Mw/Mn of the comparable interpolymer is also within 10 percent of that of the block interpolymer and/or the comparable interpolymer has a total comonomer content within 10 weight percent of that of the block interpolymer.

In still another aspect, the ethylene/α-olefin interpolymers are characterized by an elastic recovery, Re, in percent at 300 percent strain and 1 cycle measured on a compression-molded film of an ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$Re > 1481 - 1629(d)$ in some embodiments;

$Re \geq 1491 - 1629(d)$ in other embodiments;

$Re \geq 1501 - 1629(d)$ in other embodiments; and $Re \geq 1511 - 1629(d)$ in yet other embodiments.

In some embodiments, the ethylene/α-olefin interpolymers have a tensile strength above 10 MPa; a tensile strength $\geq 11$ MPa in other embodiments; and a tensile strength $\geq 13$ MPa in yet other embodiments. In some embodiments, the ethylene/α-olefin interpolymers may have an elongation at break of at least 600 percent at a crosshead separation of 11 cm/minute; at least 700 percent in other embodiments; at least 800 percent in other embodiments; and at least 900 percent at a crosshead separation rate of 11 cm/minute in yet other embodiments.

In other embodiments, the ethylene/α-olefin interpolymers have (1) a storage modulus ratio, G'(25° C.)/G'(100° C.), of from 1 to 50, from 1 to 20 in other embodiments; and from 1 to 10 in yet other embodiments. In some embodiments, the ethylene/α-olefin interpolymers may have a 70° C. compression set of less than 80 percent; less than 70 percent in other embodiments; less than 60 percent in other embodiments; and, less than 50 percent, or less than 40 percent, down to a compression set of 0 percent in yet other embodiments.

In some embodiments, the ethylene/α-olefin interpolymers have a heat of fusion of less than 85 J/g. In other embodiments, the ethylene/α-olefin interpolymers may have a pellet blocking strength of equal to or less than 100 pounds/foot$^2$ (4800 Pa); equal to or less than 50 lbs/ft$^2$ (2400 Pa) in other embodiments; equal to or less than 5 lbs/ft$^2$ (240 Pa), and as low as 0 lbs/ft$^2$ (0 Pa) in yet other embodiments.

In other embodiments, the ethylene/α-olefin interpolymers comprise, in polymerized form, at least 50 mole percent ethylene and have a 70° C. compression set of less than 80 percent; less than 70 percent in other embodiments; less than 60 percent in other embodiments; and less than 40 to 50 percent and down to a compression set close to zero percent in yet other embodiments.

In some embodiments, the multi-block copolymers possess a PDI fitting a Schultz-Flory distribution rather than a Poisson distribution. The copolymers may be further characterized as having both a polydisperse block distribution and a polydisperse distribution of block sizes and possessing a most probable distribution of block lengths. Preferred multi-block copolymers are those containing 4 or more blocks or segments including terminal blocks. More preferably, the copolymers include at least 5, 10 or 20 blocks or segments including terminal blocks.

In addition, the block interpolymers have additional characteristics or properties. In one aspect, the interpolymers, preferably comprising ethylene and one or more copolymerizable comonomers in polymerized form, are characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C. when fractionated using TREF, characterized in that said fraction has a molar comonomer content higher, preferably at least 5 percent higher, more preferably at least 10 percent higher, than that of a comparable random ethylene interpolymer fraction eluting between the same temperatures, wherein said comparable random ethylene interpolymer comprises the same comonomer(s), and has a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

Comonomer content may be measured using any suitable technique, with techniques based on nuclear magnetic resonance ("NMR") spectroscopy preferred. Moreover, for polymers or blends of polymers having relatively broad TREF curves, the polymer is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

In another aspect, the block interpolymer is an olefin interpolymer, preferably comprising ethylene and one or more copolymerizable comonomers in polymerized form, characterized by multiple blocks (i.e., at least two blocks) or segments of two or more polymerized monomer units differing in chemical or physical properties (blocked interpolymer), most preferably a multi-block copolymer, said block interpolymer having a peak (but not just a molecular fraction) which elutes between 40° C. and 130° C. (but without collecting and/or isolating individual fractions), characterized in that said peak, has a comonomer content estimated by infra-red spectroscopy when expanded using a full width/half maximum (FWHM) area calculation, has an average molar comonomer content higher, preferably at least 5 percent higher in some embodiments, at least 10 percent higher in other embodiments, than that of a comparable random ethylene interpolymer peak at the same elution temperature and expanded using a full width/half maximum (FWHM) area calculation, wherein said comparable random ethylene interpolymer has the same comonomer(s) and has a melt index, density, and molar comonomer content (based on the whole polymer) within 10 percent of that of the blocked interpolymer. The Mw/M n of the comparable interpolymer may also within 10 percent of that of the blocked interpolymer and/or the comparable interpolymer has a total comonomer content within 10 weight percent of that of the blocked interpolymer. The full width/half maximum (FWHM) calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between $T_1$ and $T_2$, where $T_1$ and $T_2$ are points determined, to the left and right of the ATREF peak, by dividing the peak height by two, and then drawing a line horizontal to the base line, that intersects the left and right portions of the ATREF curve. A calibration curve for comonomer content is made using random ethylene/α-olefin copolymers, plotting comonomer content from NMR versus FWHM area ratio of the TREF peak. For this infra-red method, the calibration curve is generated for the same comonomer type of interest. The comonomer content of TREF peak of the block interpolymer can be determined by referencing this calibration curve using its FWHM methyl: methylene area ratio [$CH_3/CH_2$] of the TREF peak.

Comonomer content may be measured using any suitable technique, with techniques based on nuclear magnetic resonance (NMR) spectroscopy preferred. Using this technique, said blocked interpolymers have higher molar comonomer content than a corresponding comparable interpolymer.

In some embodiments, for interpolymers of ethylene and 1-octene, the block interpolymer may have a comonomer content of the TREF fraction eluting between 40 and 130° C. greater than or equal to the quantity (−0.2013) T+20.07, where T is the numerical value of the peak elution temperature of the TREF fraction being compared, measured in ° C. The comonomer content of the TREF fraction eluting between 40 and 130° C. may be greater than or equal to the quantity (−0.2013)*T+21.07 in other embodiments.

In addition to the above aspects and properties described herein, the block interpolymers can be characterized by one or more additional characteristics. In one aspect, the block interpolymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that said fraction has a molar comonomer content higher, preferably at least 5 percent higher, more preferably at least 10, 15, 20 or 25 percent higher, than that of a comparable random ethylene interpolymer fraction eluting between the same temperatures, wherein said comparable random ethylene interpolymer comprises the same comonomer(s), preferably it is the same comonomer(s), and a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

In some embodiments, the above interpolymers may be interpolymers of ethylene and at least one α-olefin, especially those interpolymers having a whole polymer density from about 0.855 to about 0.935 g/cm$^3$. In other embodiments, for polymers having more than about 1 mole percent comonomer, the blocked interpolymer may have a comonomer content of the TREF fraction eluting between 40 and 130° C. greater than or equal to the quantity (−0.1356)*T+13.89 where T is the numerical value of the peak ATREF elution temperature of the TREF fraction being compared, measured in ° C. In other embodiments, the comonomer content of the TREF fraction eluting between 40 and 130° C. may be greater than or equal to the quantity (−0.1356)*T+14.93; and greater than or equal to the quantity (−0.2013)*T+21.07 in yet other embodiments.

In still another aspect, the block interpolymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction having a comonomer content of at least about 6 mole percent, has a melting point greater than about 100° C. For those fractions having a comonomer content from about 3 mole percent to about 6 mole percent, every fraction has a DSC melting point of about 110° C. or higher. In other embodiments, the polymer fractions, having at least 1 mole percent comonomer, has a DSC melting point that corresponds to the equation:

$$Tm \geq (-5.5926)(\text{mol percent comonomer in the fraction}) + 135.90.$$

In yet another aspect, the block interpolymer is an olefin interpolymer comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction that has an ATREF elution temperature greater than or equal to about 76° C., has a melt enthalpy (heat of fusion) as measured by DSC, corresponding to the equation:

$$\text{Heat of fusion (J/gm)} \leq (3.1718)(ATREF \text{ elution temperature } ° C.) - 136.58,$$

The block interpolymers may have a molecular fraction which elutes between 40° C. and 130° C., when fractionated using TREF increments, characterized in that every fraction that has an ATREF elution temperature between 40° C. and less than about 76° C., has a melt enthalpy (heat of fusion) as measured by DSC, corresponding to the equation:

$$\text{Heat of fusion (J/gm)} \leq (1.1312)(ATREF \text{ elution temperature in } ° C.) + 22.97.$$

ATREF Peak Comonomer Composition Measurement by Infra-Red Detector

The comonomer composition of the TREF peak can be measured using an IR4 infra-red detector available from Polymer Char, Valencia, Spain (http://www.polymerchar.com/).

The "composition mode" of the detector is equipped with a measurement sensor ($CH_2$) and composition sensor ($CH_3$) that are fixed narrow band infra-red filters in the region of 2800-3000 cm$^{-1}$. The measurement sensor detects the methylene ($CH_2$) carbons on the polymer (which directly relates to the polymer concentration in solution) while the composition sensor detects the methyl ($CH_3$) groups of the polymer. The mathematical ratio of the composition signal ($CH_3$) divided by the measurement signal ($CH_2$) is sensitive to the comonomer content of the measured polymer in solution and its response is calibrated with known ethylene alpha-olefin copolymer standards.

The detector when used with an ATREF instrument provides both a concentration ($CH_2$) and composition ($CH_3$) signal response of the eluted polymer during the TREF process. A polymer specific calibration can be created by measuring the area ratio of the $CH_3$ to $CH_2$ for polymers with known comonomer content (preferably measured by NMR). The comonomer content of an ATREF peak of a polymer can be estimated by applying the reference calibration of the ratio of the areas for the individual $CH_3$ and $CH_2$ response (i.e. area ratio $CH_3/CH_2$ versus comonomer content).

The area of the peaks can be calculated using a full width/half maximum (FWHM) calculation after applying the appropriate baselines to integrate the individual signal responses from the TREF chromatogram. The full width/half maximum calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between T1 and T2, where T1 and T2 are points determined, to the left and right of the ATREF peak, by dividing the peak height by two, and then drawing a line horizontal to the base line, that intersects the left and right portions of the ATREF curve.

The application of infra-red spectroscopy to measure the comonomer content of polymers in this ATREF-infra-red method is, in principle, similar to that of GPC/FTIR systems as described in the following references: Markovich, Ronald P.; Hazlitt, Lonnie G.; Smith, Linley; "Development of gel-permeation chromatography-Fourier transform infrared spectroscopy for characterization of ethylene-based polyolefin copolymers". Polymeric Materials Science and Engineering (1991), 65, 98-100.; and Deslauriers, P. J.; Rohlfing, D. C.; Shieh, E. T.; "Quantifying short chain branching microstructures in ethylene-1-olefin copolymers using size exclusion chromatography and Fourier transform infrared spectroscopy (SEC-FTIR)", Polymer (2002), 43, 59-170., both of which are incorporated by reference herein in their entirety.

It should be noted that while the TREF fractions in the above description are obtained in a 5° C. increment, other temperature increments are not possible. For instance, a TREF fraction be in a 4° C. increment, a 3° C. increment, a 2° C. increment, or 1° C. increment.

For copolymers of ethylene and an α-olefin, the block interpolymers preferably possess (1) a PDI of at least 1.3, more preferably at least 1.5, at least 1.7, or at least 2.0, and most preferably at least 2.6, up to a maximum value of 5.0, more preferably up to a maximum of 3.5, and especially up to a maximum of 2.7; (2) a heat of fusion of 80 J/g or less; (3) an ethylene content of at least 50 weight percent; (4) a glass transition temperature, $T_g$, of less than −25° C., more preferably less than −30° C., and/or (5) one and only one $T_m$.

Further, the block interpolymers may have, alone or in combination with any other properties disclosed herein, a storage modulus, G', such that log (G') is greater than or equal to 400 kPa at a temperature of 100° C.; and greater than or equal to 1.0 MPa in other embodiments. Moreover, the block interpolymers may possess a relatively flat storage modulus as a function of temperature in the range from 0 to 100° C. that is characteristic of block copolymers, and heretofore unknown for an olefin copolymer, especially a copolymer of ethylene and one or more $C_{3-8}$ aliphatic α-olefins. (By the term "relatively flat" in this context is meant that log G' (in Pascals) decreases by less than one order of magnitude between 50 and 100° C., preferably between 0 and 100° C.).

The block interpolymers may be further characterized by a thermomechanical analysis penetration depth of 1 mm at a temperature of at least 90° C. as well as a flexural modulus of from 3 kpsi (20 MPa) to 13 kpsi (90 MPa). Alternatively, the block interpolymers may have a thermomechanical analysis penetration depth of 1 mm at a temperature of at least 104° C. as well as a flexural modulus of at least 3 kpsi (20 MPa). They may be characterized as having an abrasion resistance (or volume loss) of less than 90 $mm^3$.

Additionally, the ethylene/α-olefin interpolymers may have a melt index, $I_2$, from 0.01 to 2000 g/10 minutes in some embodiments; from 0.01 to 1000 g/10 minutes in other embodiments; from 0.01 to 500 g/10 minutes in other embodiments; and from 0.01 to 100 g/10 minutes in yet other embodiments. In certain embodiments, the ethylene/α-olefin interpolymers may have a melt index, $I_2$, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments, the melt index for the ethylene/α-olefin polymers is 1 g/10 minutes, 3 g/10 minutes or 5 g/10 minutes.

The interpolymers may have molecular weights, $M_w$, from 1,000 g/mole to 5,000,000 g/mole in some embodiments; from 1000 g/mole to 1,000,000 in other embodiments; from 10,000 g/mole to 500,000 g/mole in other embodiments; and from 10,000 g/mole to 300,000 g/mole in yet other embodiments. The density of the block interpolymers may be from 0.80 to 0.99 $g/cm^3$ in some embodiments; and for ethylene containing polymers from 0.85 $g/cm^3$ to 0.97 $g/cm^3$. In certain embodiments, the density of the ethylene/α-olefin polymers may range from 0.860 to 0.925 $g/cm^3$ or 0.867 to 0.910 $g/cm^3$.

The process of making the polymers has been disclosed in the following patent applications: U.S. Provisional Application No. 60/553,906, filed Mar. 17, 2004; U.S. Provisional Application No. 60/662,937, filed Mar. 17, 2005; U.S. Provisional Application No. 60/662,939, filed Mar. 17, 2005; U.S. Provisional Application No. 60/662,938, filed Mar. 17, 2005; PCT Application No. PCT/US2005/008916, filed Mar. 17, 2005; PCT Application No. PCT/US2005/008915, filed Mar. 17, 2005; and PCT Application No. PCT/US2005/008917, filed Mar. 17, 2005, all of which are incorporated by reference herein in their entirety. For example, one such method comprises contacting ethylene and optionally one or more addition polymerizable monomers other than ethylene under addition polymerization conditions with a catalyst composition comprising:

the admixture or reaction product resulting from combining:

(A) a first olefin polymerization catalyst having a high comonomer incorporation index, (B) a second olefin polymerization catalyst having a comonomer incorporation index less than 90 percent, preferably less than 50 percent, most preferably less than 5 percent of the comonomer incorporation index of catalyst (A), and (C) a chain shuttling agent.

Representative catalysts and chain shuttling agent are as follows.

Catalyst (A1) is [N-(2,6-di(1-methylethyl)phenyl)amido)(2-isopropylphenyl)(α-naphthalen-2-diyl(6-pyridin-2-diyl)methane)]hafnium dimethyl, prepared according to the teachings of WO 03/40195, U.S. Pat. Nos. 6,953,764 and 6,960,635, and WO 04/24740:

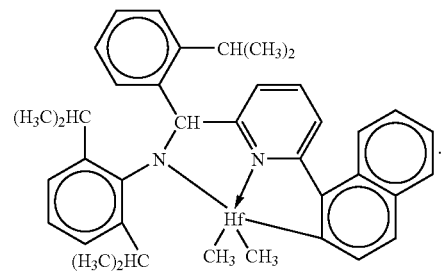

Catalyst (A2) is [N-(2,6-di(1-methylethyl)phenyl)amido)(2-methylphenyl)(1,2-phenylene-(6-pyridin-2-diyl)methane)]hafnium dimethyl, prepared according to the teachings of WO 03/40195, U.S. Pat. Nos. 6,953,764 and 6,960,635, and WO 04/24740:

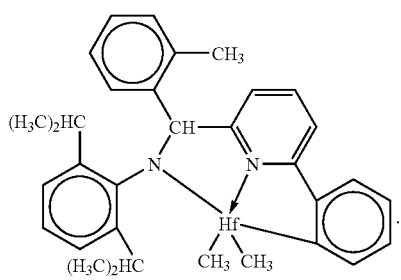

Catalyst (A3) is bis[N,N'''-(2,4,6-tri(methylphenyl)amido) ethylenediamine]hafnium dibenzyl:

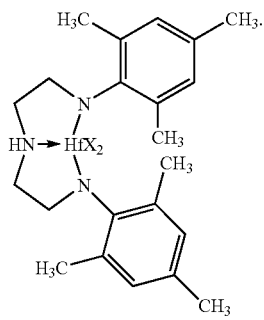

X = CH₂C₆H₅

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of U.S. Pat. No. 6,897,276:

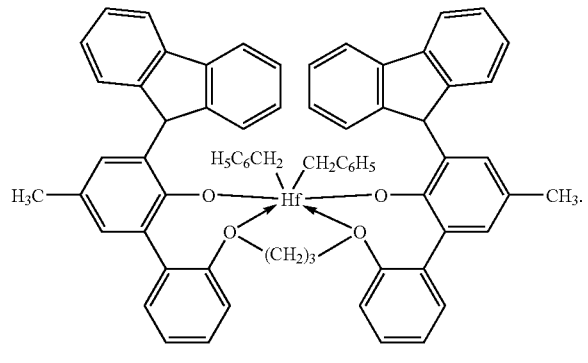

Catalyst (B1) is 1,2-bis-(3,5-di-t-butylphenylene)(1-(N-(1-methylethyl)immino)mehyl)(2-oxoyl) zirconium dibenzyl:

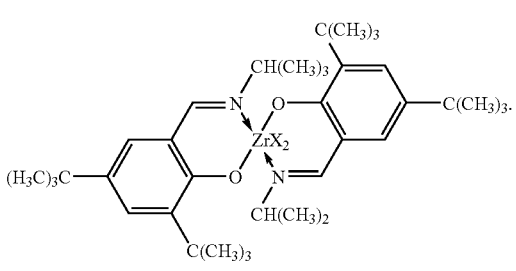

X = CH₂C₆H₅

Catalyst (B2) is 1,2-bis-(3,5-di-t-butylphenylene)(1-(N-(2-methylcyclohexyl)-immino)methyl)(2-oxoyl) zirconium dibenzyl:

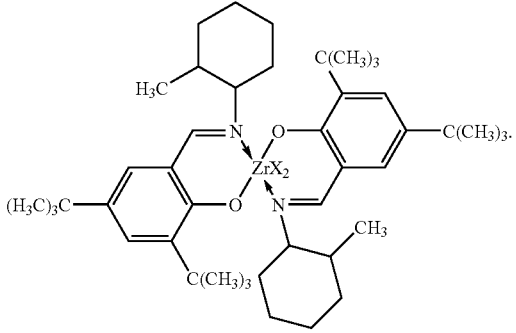

X = CH₂C₆H₅

Catalyst (C1) is (t-butylamido)dimethyl(3-N-pyrrolyl-1,2,3,3a,7a-η-inden-1-yl)silanetitanium dimethyl prepared substantially according to the techniques of U.S. Pat. No. 6,268,444:

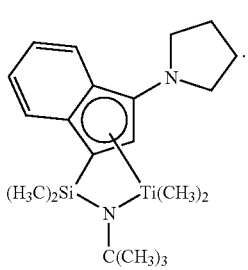

Catalyst (C2) is (t-butylamido)di(4-methylphenyl)(2-methyl-1,2,3,3a,7a-η-inden-1-yl)silanetitanium dimethyl prepared substantially according to the teachings of U.S. Pat. No. 6,825,295:

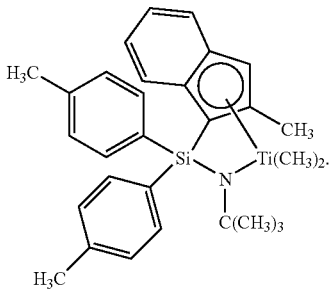

Catalyst (C3) is (t-butylamido)di(4-methylphenyl)(2-methyl-1,2,3,3a,8a-η-s-indacen-1-yl)silanetitanium dimethyl prepared substantially according to the teachings of U.S. Pat. No. 6,825,295:

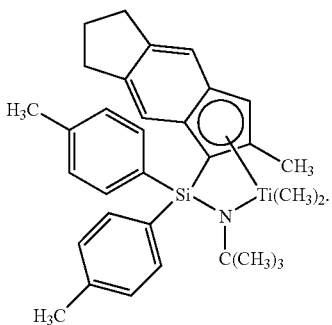

Catalyst (D1) is bis(dimethyldisiloxane)(indene-1-yl)zirconium dichloride available from Sigma-Aldrich:

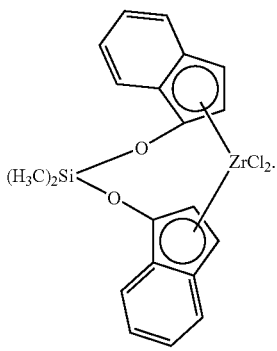

Shuttling Agents The shuttling agents employed include diethylzinc, di(i-butyl)zinc, di(n-hexyl)zinc, triethylaluminum, trioctylaluminum, triethylgallium, i-butylaluminum bis(dimethyl(t-butyl)siloxane), i-butylaluminum bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxide), n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide), ethylzinc (2,6-diphenylphenoxide), and ethylzinc (t-butoxide).

The foregoing process may take the form of a continuous solution process for forming block copolymers, especially multi-block copolymers, preferably linear multi-block copolymers of two or more monomers, more especially ethylene and a $C_{3-20}$ olefin or cycloolefin, and most especially ethylene and a $C_{4-20}$ α-olefin, using multiple catalysts that are incapable of interconversion. That is, the catalysts are chemically distinct. Under continuous solution polymerization conditions, the process is ideally suited for polymerization of mixtures of monomers at high monomer conversions. Under these polymerization conditions, shuttling from the chain shuttling agent to the catalyst becomes advantaged compared to chain growth, and multi-block copolymers, especially linear multi-block copolymers are formed in high efficiency.

The block interpolymers may be differentiated from conventional, random copolymers, physical blends of polymers, and block copolymers prepared via sequential monomer addition, fluxional catalysts, anionic or cationic living polymerization techniques. In particular, compared to a random copolymer of the same monomers and monomer content at equivalent crystallinity or modulus, the block interpolymers have better (higher) heat resistance as measured by melting point, higher TMA penetration temperature, higher high-temperature tensile strength, and/or higher high-temperature torsion storage modulus as determined by dynamic mechanical analysis. Compared to a random copolymer containing the same monomers and monomer content, the block interpolymers have lower compression set, particularly at elevated temperatures, lower stress relaxation, higher creep resistance, higher tear strength, higher blocking resistance, faster setup due to higher crystallization (solidification) temperature, higher recovery (particularly at elevated temperatures), better abrasion resistance, higher retroactive force, and better oil and filler acceptance.

The block interpolymers also exhibit a unique crystallization and branching distribution relationship. That is, the block interpolymers have a relatively large difference between the tallest peak temperature measured using CRYSTAF and DSC as a function of heat of fusion, especially as compared to random copolymers containing the same monomers and monomer level or physical blends of polymers, such as a blend of a high density polymer and a lower density copolymer, at equivalent overall density. It is believed that this unique feature of the block interpolymers is due to the unique distribution of the comonomer in blocks within the polymer backbone. In particular, the block interpolymers may comprise alternating blocks of differing comonomer content (including homopolymer blocks). The block interpolymers may also comprise a distribution in number and/or block size of polymer blocks of differing density or comonomer content, which is a Schultz-Flory type of distribution. In addition, the block interpolymers also have a unique peak melting point and crystallization temperature profile that is substantially independent of polymer density, modulus, and morphology. In a preferred embodiment, the microcrystalline order of the polymers demonstrates characteristic spherulites and lamellae that are distinguishable from random or block copolymers, even at PDI values that are less than 1.7, or even less than 1.5, down to less than 1.3.

Moreover, the block interpolymers may be prepared using techniques to influence the degree or level of blockiness. That is the amount of comonomer and length of each polymer block or segment can be altered by controlling the ratio and type of catalysts and shuttling agent as well as the temperature of the polymerization, and other polymerization variables. A surprising benefit of this phenomenon is the discovery that as the degree of blockiness is increased, the optical properties, tear strength, and high temperature recovery properties of the resulting polymer are improved. In particular, haze decreases while clarity, tear strength, and high temperature recovery properties increase as the average number of blocks in the polymer increases. By selecting shuttling agents and catalyst combinations having the desired chain transferring ability (high rates of shuttling with low levels of chain termination) other forms of polymer termination are effectively suppressed. Accordingly, little if any β-hydride elimination is observed in the polymerization of ethylene/α-olefin comonomer mixtures according to embodiments of the invention, and the resulting crystalline blocks are highly, or substantially completely, linear, possessing little or no long chain branching.

Polymers with highly crystalline chain ends can be selectively prepared in accordance with embodiments of the invention. In elastomer applications, reducing the relative quantity of polymer that terminates with an amorphous block reduces the intermolecular dilutive effect on crystalline regions. This result can be obtained by choosing chain shuttling agents and catalysts having an appropriate response to hydrogen or other chain terminating agents. Specifically, if the catalyst which produces highly crystalline polymer is more susceptible to chain termination (such as by use of hydrogen) than the catalyst responsible for producing the less crystalline polymer segment (such as through higher comonomer incorporation, regio-error, or atactic polymer formation), then the highly crystalline polymer segments will preferentially populate the terminal portions of the polymer. Not only are the resulting terminated groups crystalline, but upon termination, the highly crystalline polymer forming catalyst site is once again available for reinitiation of polymer formation. The initially formed polymer is therefore another highly crystalline polymer segment. Accordingly, both ends of the resulting multi-block copolymer are preferentially highly crystalline.

The ethylene α-olefin interpolymers used in the embodiments of the invention are preferably interpolymers of ethylene with at least one $C_3$-$C_{20}$ α-olefin. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or nonconjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

Other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Suitable olefins are $C_3$-$C_{20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_1$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

Other olefin interpolymers include olefin polymers comprising monovinylidene aromatic monomers including styrene, o-methyl styrene, p-methyl styrene, t-butylstyrene, and the like. In particular, interpolymers comprising ethylene and styrene may be used. In other embodiments, copolymers comprising ethylene, styrene and a $C_3$-$C_{20}$ α-olefin, optionally comprising a $C_4$-$C_{20}$ diene, having improved properties, may be used.

Suitable non-conjugated diene monomers may include straight chain, branched chain or cyclic hydrocarbon dienes having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

One class of desirable polymers that may be made in accordance with embodiments of the invention includes elastomeric interpolymers of ethylene, a $C_3$-$C_{20}$ α-olefin, especially propylene, and optionally one or more diene monomers. Preferred α-olefins for use in this embodiment of the present invention are designated by the formula $CH_2=CHR^*$, where $R^*$ is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

Because the diene-containing polymers comprise alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

In some embodiments, the block interpolymers made with two catalysts incorporating differing quantities of comonomer have a weight ratio of blocks formed thereby ranging from 95:5 to 5:95. The elastomeric polymers desirably have an ethylene content of from 20 to 90 percent, a diene content of from 0.1 to 10 percent, and an α-olefin content of from 10 to 80 percent, based on the total weight of the polymer. Further preferably, the multi-block elastomeric polymers have an ethylene content of from 60 to 90 percent, a diene content of from 0.1 to 10 percent, and an α-olefin content of from 10 to 40 percent, based on the total weight of the polymer. In some embodiments, the interpolymers are high molecular weight polymers, having a weight average molecular weight (Mw) from 10,000 to about 2,500,000; from 20,000 to 500,000 in other embodiments; and from 20,000 to 350,000 in yet other embodiments. In some embodiments, the interpolymers may have a polydispersity less than 3.5; less than 3.0 in other embodiments. In other embodiments, the interpolymer may have a Mooney viscosity (ML (1+4) 125° C.) ranging from 1 to 250. In other embodiments, such polymers may have an ethylene content from 65 to 75 percent, a diene content from 0 to 6 percent, and an α-olefin content from 20 to 35 percent.

The ethylene/α-olefin interpolymers may be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to an ethylene/α-olefin interpolymer, or it may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927,888, and 4,950,541, the disclosures of these patents are incorporated herein by reference in their entirety. One particularly useful functional group is maleic anhydride.

The amount of the functional group present in the functional interpolymer may vary. The functional group may be present in a copolymer-type functionalized interpolymer in an amount of at least about 1.0 weight percent in some embodiments; at least about 5 weight percent in other embodiments; and at least about 7 weight percent in yet other embodiments. The functional group may be present in a copolymer-type functionalized interpolymer in an amount less than about 40 weight percent in some embodiments; less than about 30 weight percent in other embodiments; and less than about 25 weight percent in yet other embodiments.

Again, this non-comprehensive list is just representative of the types of polymers that may be used in forming the dispersions and adhesive compositions in accordance with embodiments of the present invention. Those having ordinary skill in the art will recognize that a number of other suitable polymers exist. Moreover, those of ordinary skill in the art will appreciate that combinations of the above polymers may be used. In select embodiments, combinations of the same polymers having different MW's may also be used. Thus, it will be appreciated that combinations may involve different polymers, or similar polymers having different characteristics, or combinations thereof.

In selected embodiments, polymers used in embodiments of the present invention have an $M_w$ value of 300,000 or less (as measured using the GPC system described below). In other embodiments, the polymers have an $M_w$ of 200,000 or less. In yet other embodiments, the polymers have an $M_w$ of 150,000 or less and can be as low as about 5,000.

Description of GPC System

The chromatographic system consists of either a Polymer Laboratories Model PL-210 or a Polymer Laboratories Model PL-220. The column and carousel compartments are temperature-controlled to promote reproducible chromatography, promote dissolution, and reduce solvent viscosity. The columns, three, are Polymer Laboratories 10-micron Mixed-B columns. The samples are prepared at a concentration of 0.1 grams of polymer in 50 milliliters of solvent. The solvent to prepare the samples contains 200 ppm of butylated hydroxytoluene (BHT) or other appropriate stabilizer if necessary. Samples are prepared by agitating lightly until fully dissolved, heating if necessary. The injection volume is 100 microliters and the flow rate is 1.0 milliliters/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 40° C. with gentle agitation for 30 minutes. The narrow standards mixtures are run first and in order of decreasing molecular weight component to minimize degradation. Polystyrene-equivalent molecular weight calculations were performed using Viscotek TriSEC software Version 3.0.

Plate count should be measured to ensure that the column resolution is adequate. The plate count calculates the peak retention volume (RV) and relates it to the retention volume (RV) width at ½ height (50% of the chromatographic peak) to get an effective measure of the number of theoretical plates in a column as shown in the equation below:

$$\text{Plate Count} = 5.54 * [\text{RV peak maximum}/(\text{RV Rear 50\% peak height} - \text{RV Front 50\% peak height})^2].$$

Typically, the minimum acceptable plate count for the analysis is 28,000.

To facilitate the highest accuracy of a retention volume measurement of the flow marker peak, a least-squares fitting routine is used to fit the local peak apex of the flow marker concentration chromatogram to a quadratic equation. The first derivative of the quadratic equation is then used to solve for the true peak position. After calibrating the system based on a flow marker peak, the effective flowrate (as a measurement of the calibration slope) is calculated as shown in the equation below:

Flow rate effective=Flow rate nominal*FlowMarker calibration/Flowmarker observed In the GPC system, an antioxidant mismatch peak or an air peak (if the mobile phase is sufficiently degassed) can be used as an effective flow marker. The primary features of an effective flowrate marker are as follows: the flow marker should be mono-dispersed; the flow marker should elute close to the total column permeation volume; the flow marker should not interfere with the chromatographic integration window of the sample; and, the flow marker should not have any non-size exclusion interactions with the column set.

Waxes:

Waxes useful in embodiments of the present invention include Fischer-Tropsch waxes, petroleum-derived waxes, and synthetic waxes. These waxes are commercially available, for example, from Sasol. Large oil companies such as Shell Oil, ExxonMobil, and other oil refiners supply petroleum waxes suitable for use in these applications. Montan waxes are another type of suitable waxes. Most of these waxes are obtained in the process of refining lube oil, where the waxes are separated from the lube oil stock and refined into various fractions of waxes including paraffins and microcrystalline waxes. Formulators such as Astor Wax, IGI, and Moore & Munger also supply waxes suitable for these applications. These waxes are resold as is from the oil companies and/or formulated and repackaged to meet the specific needs of customers.

In addition to synthetic and/or petroleum-derived waxes, a number of other "natural" waxes may be used, such as carnauba waxes, and commercially available high triglyceride waxes derived from the processing of natural oil-containing commodities such as soybeans, palm and other crops from which oil can be obtained.

Suitable waxes may be obtained from Archer Daniels Midland (Decatur Ill.) designated by their product number 86-197-0; Cargill Incorporated (Wayzata, Minn.) designated by their product number 800mrcs0000u; and other sources under a generic name 'hydrogenated soybean oil'. Palm oil wax may be obtained by Custom Shortenings & Oils (Richmond, Va.) and is designated as Master Chef Stable Flake-P. Soybean wax is also distributed by Marcus Oil and Chemical Corp. (Houston, Tex.) under the designation of "Marcus Nat 155". These waxes can also be used as food additives. In embodiments involving PSAs, the waxes listed above may be replaced with oils (which may be similarly constituted).

Tackifying Resins:

Tackifying resins useful in the present invention include aliphatic, cycloaliphatic, and aromatic hydrocarbons and modified hydrocarbons and hydrogenated versions; terpenes and modified terpenes and hydrogenated versions; and rosins and rosin derivatives and hydrogenated versions; and mixtures thereof. These tackifying resins have a ring and ball softening point from 70° C. to 150° C., and will typically have a viscosity at 350° F. (177° C.), as measured using a Brookfield viscometer, of no more than 2000 centipoise. They are also available with differing levels of hydrogenation, or saturation, which is another commonly used term.

Useful examples include EASTOTAC™ H-100, H-115 and H-130 from Eastman Chemical Co. (Kingsport, Tenn.), which are partially hydrogenated cycloaliphatic petroleum hydrocarbon resins with softening points of 100° C., 115° C. and 130° C., respectively. These are available in the E grade, the R grade, the L grade and the W grade, indicating differing levels of hydrogenation with E being the least hydrogenated and W being the most hydrogenated. The E grade has a bromine number of 15, the R grade a bromine number of 5, the L grade a bromine number of 3, and the W grade a bromine number of 1. EASTOTAC™ H-142R from Eastman Chemical Co. has a softening point of about 140° C. Other useful tackifying resins include ESCOREZ™ 5300, 5400, and 5637, partially hydrogenated cycloaliphatic petroleum hydrocarbon resins; and ESCOREZ™ 5600, a partially hydrogenated aromatic modified petroleum hydrocarbon resin, which are available from Exxon Chemical Co. (Houston, Tex.); and WINGTACK™ Extra, which is an aliphatic, aromatic petroleum hydrocarbon resin available from Goodyear Chemical Co. (Akron, Ohio).

There are numerous types of rosins and modified rosins available with differing levels of hydrogenation including gum rosins, wood rosins, tall-oil rosins, distilled rosins, dimerized rosins, and polymerized rosins. Some specific modified rosins include glycerol and pentaerythritol esters of wood rosins and tall-oil rosins. Commercially available grades include, but are not limited to, SYLVATAC™ 1103, a pentaerythritol rosin ester available from Arizona Chemical Co. (Jacksonville, Fla.); UNITAC™ R-100 Lite, a pentaerythritol rosin ester available from Union Camp (Wayne, N.J.); PERMALYN™ 305, an erythritol modified wood rosin available from Hercules, Inc. (Brunswick, Ga.) and FORAL 105, which is a highly hydrogenated pentaerythritol rosin ester also available from Hercules, Inc. (Brunswick, Ga.). SYLVATAC™ R-85 and 295 are 85° C. and 95° C. melting point rosin acids available from Arizona Chemical Co. and FORAL AX is a 70° C. melting point hydrogenated rosin acid available from Hercules, Inc. NIREZ V-2040 is a phenolic modified terpene resin available from Arizona Chemical Co.

Another exemplary tackifier, PICCOTAC™ 115 available from Eastman Chemical Co., has a viscosity at 350° F. (177° C.) of about 1600 centipoise. Other typical tackifiers have viscosities at 350° F. (177° C.) of much less than 1600 centipoise, for instance, from 50 to 300 centipoise.

Exemplary aliphatic resins include those available under the trade names ESCOREZ™, PICCOTAC™, MERCURES™, WINGTACK™, HI-REZ™, QUINTONE™, TACKIROL™, etc. Exemplary polyterpene resins include those available under the trade designations NIREZ™, PICCOLYTE™, WINGTACK™, ZONAREZ™, etc. Exemplary hydrogenated resins include those available under the trade names ESCOREZ™, ARKON™, CLEARON™, etc. These tackifiers may be employed with the polymers of the present invention, providing they are used at compatible levels.

In certain applications of the present invention, it is anticipated an adhesive may be prepared without the use of a tackifier or with a minimal quantity of tackifier. An adhesive may also prepared without a wax, such as a blend of a polymer and a tackifying resin.

Tackifiers added to adhesives can be characterized by parameters such as their softening points, specific gravities, or by acid number. A tackifier can be selected from among the variety of tackifiers, as described above but not limited thereto, and from tackifiers characterized by a range of acid numbers, such as acid numbers between 0 and 100, more preferably an acid number between 0 and 25.8, and most preferably a tackifier having an acid number between 3-10.

In embodiments of the present invention, the polymer and/or wax, tackifying resin, oil, and dispersing agent typically comprise between about 1 to about 74 volume percent of the total dispersion. Water, therefore, typically comprises between about 26 to 99 volume percent. However, several percent of dispersing agents, additives, biocides, and other compounds as explained below may also be present. All intermediate ranges, e.g., 5 to 50 volume percent polymer/wax/tackifying resin/oil, are included within the scope of the instant disclosure. Specific ranges include 50 to 60 percent polymer and/or wax, tackifying resin, oil, and dispersing agent of the total dispersion.

Dispersing Agent

Dispersions described herein include a dispersing agent. Any dispersing agent may be used in embodiments of the invention. As used herein the term "dispersing agent" means an agent that aids in the formation and/or the stabilization of a dispersion. Some dispersing agents can also be used to form emulsions and are described in detail by Paul Becher (Emulsions: Theory and Practice, 3rd edition, Oxford University Press, New York, 2001), incorporated herein by reference in its entirety. Dispersing agents generally fall into three classes 1) surface-active materials, 2) naturally occurring materials, and 3) finely divided solids. Surface-active agents, also called surfactants, are materials that reduce the interfacial tension between two immiscible liquid phases. They are classified according to the hydrophilic group in the molecule: anionic, cationic, nonionic, or ampholytic (amphoteric). Examples of commercially available dispersing agents may be found in McCutcheon (McCutcheon's Emulsifiers and Detergents, Glen Rock, N.J., issued annually). Examples of naturally occurring materials include phospholipids, sterols, lanolin, water-soluble gums, alginates, carageenin, and cellulose derivatives. Examples of finely divided solids include basic salts of the metals, carbon black, powdered silica, and various clay (principally bentonite).

In some embodiments, a fatty acid or fatty acid salt is used as the dispersing agent. Typical salts include alkali metal salts or alkaline earth metal salts of the fatty acid. Other salts include ammonium or alkyl ammonium salts of the fatty acid. In some embodiments, the fatty acid or its salt has 12 to fewer than 25 carbon atoms. Where the dispersing agent is a salt, the number of carbons refers to the carbon atoms associated with the fatty acid fragment. In other embodiments, the salt is formed with a fatty acid fragment that has from 15 to 25 carbon atoms. Particular embodiments use an alkali metal salt of erucic acid. Erucic acid is a fatty acid with 22 carbon atoms. Some embodiments use erucic acid in the form of rapeseed oil which is a natural oil that contains approximately 40 to about 50% erucic acid with the remainder primarily consisting of chains having 18 carbon atoms. An alkaline earth metal salt of erucic acid is also useful in some embodiments. In some preferred embodiments, fatty acids containing 16-26 carbon atoms may be used.

In particular embodiments, the salt of a fatty acid containing fewer than 25 carbon atoms is produced by neutralizing a fatty acid containing fewer than 25 carbon atoms or by saponification of an ester of a fatty acid containing fewer than 25 carbon atoms.

Some embodiments of the present invention use a fatty acid or its salt that is derived from an ester of a fatty acid. The alcohol residue constituting such ester may preferably contain 2 to 30 carbon atoms, and most preferably 6 to 20 carbon atoms. Such residue may be either a straight or a branched residue, and may also be a mixture of two or more residues each containing different number of carbon atoms. Exemplary alcohol residues include residues of higher alcohols containing 10 to 20 carbon atoms such as cetyl alcohol, stearyl alcohol, and oleyl alcohol. Some embodiments use an ester of erucic acid.

In other embodiments, the dispersing agent can be an ethylene acrylic acid copolymer. More broadly speaking, the dispersing agent may simply be an acid copolymer. For example, ethylene methacrylic acid is another suitable agent. Still other embodiments use alkyl ether carboxylates as the dispersing agent. In some embodiments, petroleum sulfonates are useful. In other embodiments, the dispersing agent is a sulfonated or polyoxyethylenated alcohol. In still other embodiments, sulfated or phosphated polyoxyethylenated alcohols are suitable. Polymeric ethylene oxide/propylene oxide/ethylene oxide dispersing agents, known as poloxamers may also be used as the dispersing agent. Primary and secondary alcohol ethoxylates are also suitable in some dispersions. Alkyl glycosides and alkyl glycerides are used in some dispersions. Of course, combinations of these dispersing agents are also suitable.

Embodiments of the present invention typically include from about 1 to 30 pph (parts per hundred) dispersing agent based on the total amount of polymer and/or wax, tackifying resin, and oil used. However, larger or smaller amounts may also be used in selected applications. In other embodiments, between 5 to 20 pph of dispersing agent may be used.

Biocides

Additionally, biocides that enhance biological stability may be used. Those having ordinary skill in the art will recognize that a number of suitable compounds exist. For example, chlorine, quaternary ammonium compounds, and sodium pentachlorophenate are all suitable examples. One particularly useful biocide is sold under the trademark DOWICIL 200, by The Dow Chemical Company (Midland, Mich.). Biocides may be present in a range from about 0 to about 1 weight percent of the total weight.

Additives

Adhesives of the present invention may also contain a number of additional components, such as a stabilizer, plasticizer, pigment, filler, or antioxidant. Among the applicable stabilizers or antioxidants which can be included in the adhesive composition of the present invention are high molecular weight hindered phenols and multifunctional phenols, such as sulfur-containing and phosphorous-containing phenols. Hindered phenols, known to those skilled in the art, may be described as phenolic compounds, which also contain sterically bulky radicals in close proximity to the phenolic hydroxyl group. Specifically, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency, and correspondingly, its reactivity. It is this hindrance that provides the stabilizing properties of these phenolic compounds.

Representative hindered phenols include; but are not limited to: 2,4,6-trialkylated monohydroxy phenols; 1,3,5-trimethyl-2,4,6-tris-(3,5-di-tert-butyl-4-hydroxybenzyl)-benzene; pentaerythritol tetrakis-3(3,5-di-tert-butyl-4-hydroxyphenyl)-propionate, commercially available under the trademark IRGANOX® 1010; n-octadecyl-3(3,5-di-tert-butyl-4-hydroxyphenyl)-propionate; 4,4'-methylenebis (4-methyl-6-tert-butyl-phenol); 4,4'-thiobis (6-tert-butyl-o-cresol); 2,6-di-tertbutylphenol; 6-(4-hydroxyphenoxy)-2,4-bis(n-octyl-thio)-1,3,5 triazine; 2-(n-octylthio)ethyl 3,5-di-tert-butyl-4-hydroxy-benzoate; di-n-octadecyl 3,5-di-tert-butyl-4-hydroxy-benzylphosphonate; and sorbitol hexa(3,3,5-di-tert-butyl-4-hydroxy-phenyl)-propionate.

Antioxidants include, but are not limited to, butylated hydroxy anisole ("BHA") or butylated hydroxy toluene ("BHT") which may also be utilized to render the formulation more thermally stable. These stabilizers and antioxidants may be added in amounts ranging from approximately 0.01% to approximately 5% by weight of the formulation.

Utilizing known synergists in conjunction with the antioxidants may further enhance the performance of these antioxidants. Some of these known synergists are, for example, thiodipropionate esters and phosphates. Chelating agents and metal deactivators, may also be used. Examples of these compounds include ethylenediaminetetraacetic acid ("EDTA"), and more preferably, its salts, and disalicylalpropylenediamine. Distearylthiodipropionate is particularly useful. When added to the adhesive composition, these stabilizers are generally present in amounts of about 0.1 to about 1.5 weight percent, and more preferably in the range of about 0.25 to about 1.0 weight percent.

Other additives known to the adhesive industry may also be used in conjunction with embodiments of the present invention. The scope of the present invention is not intended to be limited to any particular formulation set forth above or below, but instead is governed by the claims. Other typical additives may include, but are not limited to, nucleating agents, chemicals used to delay crystallization, thickeners, rheology modifiers, antiblocks, oils, and other additives.

As noted above, embodiments of the present invention relate to a selectively activatable adhesive dispersion. To form a selectively activatable dispersion in accordance with a first embodiment of the present invention, a polymer is melted in a hot melt feeder tank set at a temperature sufficient to substantially melt the polymer. The liquid polymer is then fed, at a rate that may be selected depending on the desired processing time, into a heated conduit leading to a mixer. While enroute to the mixer, the liquid polymer may be combined with one or more of the wax, tackifying resin, oil, or other additives set forth above. After arriving at the mixer, the liquid polymer (and other components, if present) are combined with a water/dispersing agent solution, which are typically pre-heated prior to their injection into the mixer. After mixing for a sufficient time, a selectively activatable adhesive dispersion is created. After exiting the mixer, hot water may be added to dilute the mixture to the desired extent. Alternatively, additives may be added to the dispersion after it leaves the mixer.

While any method may be used, one convenient way to prepare the dispersions described herein is by melt-kneading. Any melt-kneading means known in the art may be used. In some embodiments a kneader, a Banbury mixer, single-screw extruder, or a multi-screw extruder is used. A process for producing the dispersions in accordance with the present invention is not particularly limited. One preferred process, for example, is a process comprising melt-kneading the above-mentioned components according to U.S. Pat. No. 5,756,659 and U.S. Patent Publication No. 20010011118.

FIG. 1 schematically illustrates an extrusion apparatus that may be used in embodiments of the invention. An extruder 20, in certain embodiments a twin screw extruder, is coupled to a back pressure regulator, melt pump, or gear pump 30. Embodiments also provide a base reservoir 40 and an initial water reservoir 50, each of which includes a pump (not shown). Desired amounts of base and initial water are provided from the base reservoir 40 and the initial water reservoir 50, respectively. Any suitable pump may be used, but in some embodiments a pump that provides a flow of about 150 cc/min at a pressure of 240 bar is used to provide the base and the initial water to the extruder 20. In other embodiments, a liquid injection pump provides a flow of 300 cc/min at 200 bar or 600 cc/min at 133 bar. In some embodiments the base and initial water are preheated in a preheater.

In some embodiments, a basic substance or aqueous solution, dispersion or slurry thereof is added to the dispersion at any point of the process, preferably to the extruder. Typically, the basic substance is added as an aqueous solution. But in some embodiments, it is added in other convenient forms, such as pellets or granules. In some embodiments, the basic substance and water are added through separate inlets of the extruder. Examples of the basic substance which may be used for the neutralization or the saponification in the melt-kneading process include alkali metals and alkaline earth metals such as sodium, potassium, calcium, strontium, barium; inorganic amines such as hydroxylamine or hydrazine; organic amines such as methylamine, ethylamine, ethanolamine, cyclohexylamine, tetramethylammonium hydroxide; oxides, hydroxides, and hydrides of alkali metals and alkaline earth metals such as sodium oxide, sodium peroxide, potassium oxide, potassium peroxide, calcium oxide, strontium oxide, barium oxide, sodium hydroxide, potassium hydroxide, calcium hydroxide, strontium hydride, barium hydroxide, sodium hydride, potassium hydride, calcium hydride; and weak acid salts of alkaline metals and alkaline earth metals such as sodium carbonate, potassium carbonate, sodium hydrogencarbonate, potassium hydrogencarbonate, calcium hydrogencarbonate, sodium acetate, potassium acetate, calcium acetate; or ammonium hydroxide. In particular embodiments, the basic substance is a hydroxide of an alkalimetal or a hydroxide of an alkali earth metal. In some embodiments, the basic substance is selected from potassium hydroxide, sodium hydroxide, and combinations thereof.

Example formulations are described below. In general, one way to form the below described examples is by melting either HMA or PSA in a hot melt feeder tank, to create a molten HMA or PSA. The liquid HMA or PSA is then mixed with a dispersing agent. This composition is then fed into a mixer, where it is combined with water (and typically a base) to create an aqueous dispersion. The aqueous dispersion then may be deposited onto a substrate, or stored for later use.

One advantageous feature of using methods in accordance with embodiments of the present invention to form precursor dispersions is that the resultant dispersions have a small particle size. By "average particle size", the present invention means the volume-mean particle size.

Typically, the average particle size may range from 0.1 µm to 100 µm in diameter. Some preferred dispersions have an average particle size of from about 0.1 µm to about 10 µm. In some embodiments, the average particle size is from about 0.1 µm to about 5 µm. In other embodiments, dispersions have an average particle size of from about 0.5 µm to about 1.5 µm. For particles that are not spherical, the diameter of the particle is the average of the long and short axes of the particle. Particle sizes can be measured on a Beckman-Coulter LS230 laser-diffraction particle size analyzer or other suitable device.

When referring to the average particle size of an aqueous dispersion as used herein, one of ordinary skill in the art will recognize that the average sizes disclosed only include the polymer, dispersing agent, and a tackifying resin, a wax, and/or an oil. Other components, such as fillers, pigments, etc, are not included in this measurement, but may be present.

In other embodiments, a polydispersity defined as the volume-mean particle size divided by the number mean particle size is used to characterize the particle size. Embodiments of the present invention are typically characterized by having a polydispersity of less than about 5. In specific embodiments the polydispersity may be less than 3. In still other embodiments, the polydispersity may be less than 2.

Example HMA and PSA Precursor Dispersion Formulations

EXAMPLE 1

An aqueous dispersion of a National Starch Cool-Lok 34-2116 Hot Melt Adhesive (HMA), which includes a polymer, wax, and a dispersing agent (and is available from the National Starch & Chemical Company, Berkeley, Calif.) is produced in the following manner:

The HMA is melted in a hot melt feeder tank set at a temperature of 135° C. The liquid HMA is fed using the hot melter gear pump at a rate of 85 g/min into a heated conduit leading to the mixer. While in the conduit to the mixer, the liquid HMA is injected with 2.8 g/min of Industrene 106 (primarily Oleic Acid). At the mixer (Oakes M-4 4" rotor-stator operated at 800 RPM) the HMA is combined with 12.35 g/min water and 1.26 g/min of 45% (w/w) KOH solution in water, both of which are pre-heated to about 120° C. before injection into the mixer. In the mixer, an HMA-in-water dispersion is generated.

After exiting the mixer, 52 g/min of water is pre-heated to 100° C. and added into the dispersion. A 150 PSIG spring-operated check valve is used at the process outlet to maintain system pressure. The diluted dispersion product passes through the spring check valve and exits the process into the collection vessel. The resulting product is an HMA-in-water dispersion with a volume-mean particle size of about 0.6 micron as measured by a Beckman Coulter LS 230 and a polydispersity (defined as the volume-mean particle size divided by the number mean particle size) of less than 1.5.

EXAMPLE 2

An aqueous dispersion of a H.B. Fuller HM-2055PI HMA (available from H.B. Fuller Company, St. Paul, Minn.), which includes a polymer (polyethylene in this case) and a wax is produced in the following manner:

The HMA is melted in a hot melt feeder tank set at a temperature of 135° C. The liquid HMA is fed using the hot melter gear pump at a rate of 50 g/min into a heated conduit leading to the mixer. While in the conduit to the mixer, the liquid HMA is injected with 1.8 g/min of Industrene 106 (primarily Oleic Acid). At the mixer (Oakes M-4 4" rotor-stator operated at 500 RPM) the HMA is combined with 4 g/min water and 0.7 g/min of 45% (w/w) KOH solution in water, both of which are pre-heated to about 120° C. before injection into the mixer. In the mixer, an HMA-in-water dispersion is generated.

After exiting the mixer, 45 g/min of water is pre-heated to 100° C. and added into the dispersion. A 150 PSIG spring-operated check valve is used at the process outlet to maintain system pressure. The diluted dispersion product passes through the spring check valve and exits the process into the collection vessel. The resulting product is an HMA-in-water dispersion with a volume-mean particle size of about 0.8 micron as measured by a Beckman Coulter LS 230 and a polydispersity (defined as the volume-mean particle size divided by the number mean particle size) of less than 1.5.

EXAMPLE 3

An aqueous dispersion of a H.B. Fuller HL-72687PI HMA (available from H.B. Fuller Company, St. Paul, Minn.) is produced in the following manner:

The HMA is melted in a hot melt feeder tank set at a temperature of 135° C. The liquid HMA is fed using the hot melter gear pump at a rate of 50 g/min into a heated conduit leading to the mixer. While in the conduit to the mixer, the liquid HMA is injected with 1.8 g/min of Industrene 106 (primarily Oleic Acid). At the mixer (Oakes M-4 4" rotor-stator operated at 500 RPM) the HMA is combined with 4 g/min water and 0.8 g/min of 45% (w/w) KOH solution in water, both of which are pre-heated to about 120° C. before injection into the mixer. In the mixer, an HMA-in-water dispersion is generated.

After exiting the mixer, 50 g/min of water is pre-heated to 100° C. and added into the dispersion. A 150 PSIG spring-operated check valve is used at the process outlet to maintain system pressure. The diluted dispersion product passes through the spring check valve and exits the process into the collection vessel. The resulting product is an HMA-in-water dispersion with a volume-mean particle size of about 0.8 micron as measured by a Beckman Coulter LS 230 and a polydispersity (defined as the volume-mean particle size divided by the number mean particle size) of less than 1.5.

EXAMPLE 4

An aqueous dispersion of a H.B. Fuller PHL-4164 HMA (available from H.B. Fuller Company, St. Paul, Minn.), which includes a polymer, wax, oil, and tackifier is produced in the following manner:

The HMA is melted in a hot melt feeder tank set at a temperature of 135° C. The liquid HMA is fed using the hot melter gear pump at a rate of 50 g/min into a heated conduit leading to the mixer. While in the conduit to the mixer, the liquid HMA is injected with 1.8 g/min of Industrene 106 (primarily Oleic Acid). At the mixer (Oakes M-4 4" rotor-stator operated at 500 RPM) the HMA is combined with 3.5 g/min water and 0.8 g/min of 45% (w/w) KOH solution in water, both of which are pre-heated to about 120° C. before injection into the mixer. In the mixer, an HMA-in-water dispersion is generated.

After exiting the mixer, 50 g/min of water is pre-heated to 100° C. and added into the dispersion. A 150 PSIG spring-operated check valve is used at the process outlet to maintain system pressure. The diluted dispersion product passes through the spring check valve and exits the process into the collection vessel. The resulting product is an HMA-in-water dispersion with a volume-mean particle size of about 0.5 micron as measured by a Beckman Coulter LS 230 and a polydispersity (defined as the volume-mean particle size divided by the number mean particle size) of less than 1.5.

EXAMPLE 5

An aqueous dispersion of H.B. Fuller HL8141XZP PSA (available from H.B. Fuller Company, St. Paul, Minn.), which includes a polymer and an oil (mineral oil), is produced in the following manner:

The adhesive is melted in a hot melt feeder tank set at a temperature of 150° C. The liquid adhesive is fed using the hot melter gear pump at a rate of 50 g/min into a heated conduit leading to the mixer. While in the conduit to the mixer, the liquid adhesive is injected with 1.6 g/min of Industrene 106 (primarily Oleic Acid). At the mixer (Oakes M-4 4" rotor-stator operated at 500 RPM) the PSA is combined with 3.5 g/min water and 0.6 g/min of 45% (w/w) KOH solution in water, both of which are pre-heated to about 120° C. before injection into the mixer. In the mixer, an adhesive-in-water dispersion is generated.

After exiting the mixer, 50 g/min of water is pre-heated to 100° C. and added into the dispersion. A 150 PSIG spring-operated check valve is used at the process outlet to maintain system pressure. The diluted dispersion product passes through the spring check valve and exits the process into the collection vessel. The resulting product is an PSA-in-water dispersion with a volume-mean particle size of about 1.15 micron as measured by a Beckman Coulter LS 230 and a polydispersity (defined as the volume-mean particle size divided by the number mean particle size) of less than 1.5.

EXAMPLE 6

An aqueous dispersion of HB Fuller PHC9256PE Hot Melt Adhesive (HMA) (Available from HB Fuller), which includes a polymer, wax, and a dispersing agent is produced in the following manner:

The HMA and dispersing agent (30% by mass of Dow Primacor 5990i Ethylene Acrylic Acid Copolymer) is co-fed into a 25 mm twin screw extruder at about 150 g/min. The polymers are melted and fed forward into the emulsification zone, where 55 g/min water and 15.2 g/min of 45% (w/w) KOH solution are combined, pre-heated to about 100° C. and injected into the polymer mix. In the emulsification zone, an HMA-in-water dispersion is generated.

After the initial dispersion is generated, 120 g/min of water is pre-heated to 100° C. and injected into the barrel in the dilution zone, where the dilution water is incorporated under shear into the initial dispersion. Finished dispersion exits the extruder through a back-pressure regulator set at about 200 PSIG and is collected in the product collection vessel. The resulting product is an HMA-in-water dispersion with a volume-mean particle size of about 0.6 micron as measured by a Beckman Coulter LS 230 and a polydispersity (defined as the volume-mean particle size divided by the number mean particle size) of about 4.

Figure 2:
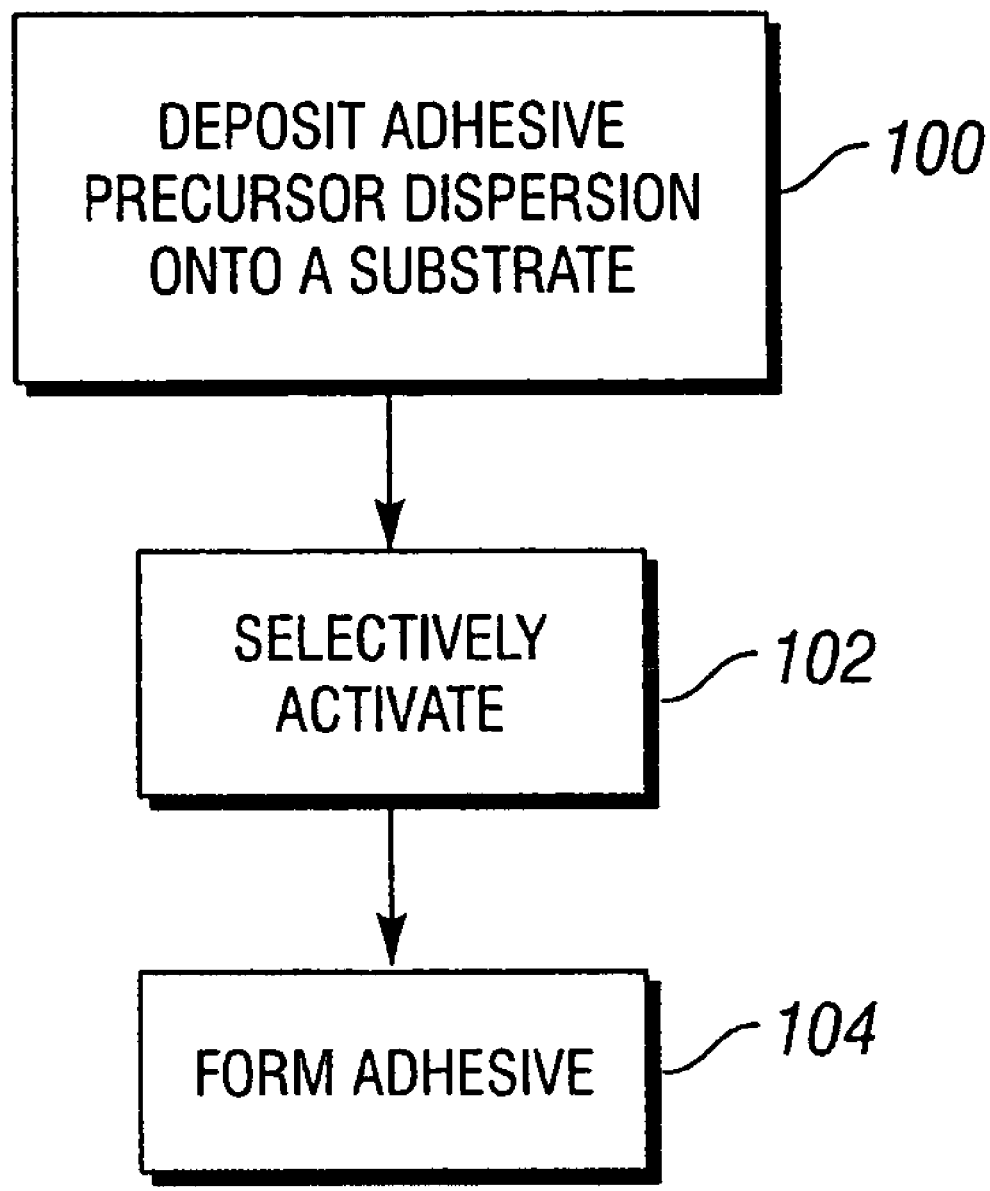
FIG. 2 shows a flow chart illustrating a method in accordance with an embodiment of the present invention.

Methods in accordance with the present invention include depositing the adhesive precursor dispersion described in this disclosure on a substrate to form a selectively activatable coating and selectively activating at least a portion of the coated substrate to form an adhesive bond. FIG. 2 shows a flowchart in accordance with such an embodiment.

In FIG. 2, a selectively activatable adhesive precursor dispersion is deposited onto a substrate (ST 100). Either after letting the precursor solution dry, or while still in an aqueous state, the adhesive precursor dispersion is heated, in the case of an HMA, or pressure is applied, in the case of a PSA, in at least one selected area. As a result of the activation step (ST 102), an adhesive is formed (ST 104). Substrates may include paper, paperboard, film, glass, ceramic, fabric, composite materials, fiber, wood, metal, clay coated cardboard, non-woven hygienics, book binding, plastic molded articles, concrete, and asphalt, for example.

In another embodiment of the present invention, steps 102 and 104 may be omitted, that is, the selectively activatable adhesive precursor solution may simply be applied to at least a portion of a substrate. The resultant coated substrate may then be shipped to another location for activation, or may be stored for later use. Thus, advantageously when compared with prior art HMAs or PSAs, an adhesive dispersion of the present invention provides a source of "on-demand" adhesives, whereby bulk quantities of coated substrates may be formed and stored for later use.

In another embodiment, the dispersions set forth herein may be made "online" in a manufacturing plant. For example, in the case of a HMA, wax, tackifying resin, and a polymer could be blended following traditional methods of preparation for HMAs. Instead of finishing the HMA in a pillow, chicklet or dragee form, as is typically done, however, the molten mixture could be pumped and metered together with the surfactant into mechanical dispersion equipment where, mixed with water, it would be processed into the final product. Advantageously, this method of preparation allows for the elimination of an intermediate step of forming the pillows, transporting them to the dispersion processing site, and remelting, saving money.

In another embodiment, an adhesive may be made from a polyolefin capable of forming an adhesive, a dispersing agent, and water, wherein the dispersion has at least one of an average particle size of from about 0.1 to about 100 microns and a polydispersity of less than 5.

Methods and formulations in accordance with embodiments of the present invention may be used in formulating a number of articles. The aqueous dispersion may be coated onto a substrate by various procedures, for example, by spray coating, curtain flow coating, coating with a roll coater or a gravure coater, brush coating or dipping. The coating is preferably dried by heating the coated substrate to 50 to 150° C. for 1 to 300 seconds, although the drying may be accomplished by any suitable means. For example, aqueous dispersions of the present invention may be coated and dried on the surface of a substrate such as paper, paperboard, film, glass, ceramic, fabric, composite materials, fiber, wood, metal, clay coated cardboard, non-woven hygienics, book binding, plastic molded articles, concrete, and asphalt. In particular, embodiments of the present invention are particularly useful with celluloid substrates.

Examples of the plastic molded articles which may be used in the present invention, include those formed from homopolymers and copolymers (including elastomers) of an alpha-olefin such as ethylene, propylene, 1-butene, 3-methyl-1-butene, 4-methyl-1-pentene, 3-methyl-1-pentene, 1-heptene, 1-hexene, 1-octene, 1-decene, and 1-dodecene as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene as typically represented by ethylene-butadiene copolymer and ethylene-ethylidene norbornene copolymer; and polyolefins (including elastomers) such as copolymers of two or more alpha-olefins with a conjugated or non-conjugated diene as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth)acrylic acid copolymers, and ethylene-(meth)acrylate copolymer; styrenic copolymers (including elastomers) such as polystyrene, ABS, acrylonitrile-styrene copolymer, and α-methylstyrene-styrene copolymer; and styrene block copolymers (including elastomers) such as styrene-butadiene copolymer and hydrates thereof, and styrene-isoprene-styrene triblock copolymer; polyvinyl compounds such as polyvinyl chloride, polyvinylidene chloride, vinyl chloride-vinylidene chloride copolymer, polymethyl acrylate, and polymethyl methacrylate; polyamides such as nylon 6, nylon 6,6, and nylon 12; thermoplastic polyesters such as polyethylene terephthalate and polybutylene terephthalate; and polycarbonate, polyphenylene oxide, and the like. These resins may be used either alone or in combinations of two or more.

In particular embodiments, aqueous dispersions may be applied to polyolefins such as polypropylene, polyethylene, and copolymers thereof and blends thereof, as well as ethylene-propylene-diene terpolymers. In some embodiments, preferred olefinic polymers include homogeneous polymers described in U.S. Pat. No. 3,645,992 by Elston; high density polyethylene (HDPE) as described in U.S. Pat. No. 4,076,698 to Anderson; heterogeneously branched linear low density polyethylene (LLDPE); heterogeneously branched ultra low linear density polyethylene (ULDPE); homogeneously branched, linear ethylene/alpha-olefin copolymers; homogeneously branched, substantially linear ethylene/alpha-olefin polymers which can be prepared, for example, by a process disclosed in U.S. Pat. Nos. 5,272,236 and 5,278,272, the disclosures of which are incorporated herein by reference; and high pressure, free radical polymerized ethylene polymers and copolymers such as low density polyethylene (LDPE), ethylene-acrylic acid (EAA) and ethylene-methacrylic acid copolymers such as, for example, those available under the tradenames PRIMACOR™, NUCREL™, and ESCOR™ and described in U.S. Pat. Nos. 4,599,392, 4,988,781, and 5,938,437, each of which is incorporated herein by reference in its entirety, and ethylene-vinyl acetate (EVA) copolymers.

Polymer compositions described in U.S. Pat. Nos. 6,538,070, 6,566,446, 5,869,575, 6,448,341, 5,677,383, 6,316,549, 6,111,023, or 5,844,045, each of which is incorporated herein by reference in its entirety, are also suitable as substrates in some embodiments. Of course, blends of polymers can be used as well. In some embodiments the blends include two different Ziegler-Natta polymers. In other embodiments, the blends can include blends of a Ziegler-Natta and a metallocene polymer. In still other embodiments, the thermoplastic resin used herein is a blend of two different metallocene polymers.

Advantageously, one or more of the embodiments in accordance with the present invention, when coated on a substrate, may provide adhesive bonds that remain effective even after exposure to refrigeration or freezing. Further, embodiments may provide adhesives that may be formed under dry or wet conditions, at lower temperatures than prior art formulations.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for forming an adhesive bond comprising:
   depositing an aqueous dispersion on a substrate to from a selectively activatable coating, the aqueous dispersion comprising:
   (A) at least one polymer capable of forming an adhesive;
   (B) at least one dispersing agent; and
   (C) at least one tackifying resin,
   wherein the dispersion has at least one of an average particle size of from about 0.1 to about 100 microns and a polydispersity of less than 5; and
   selectively activating at least a portion of the coated substrate to form the adhesive bond;
   wherein the selectively activating comprises heating to a temperature of less than about 150 C, and
   wherein the at least one polymer (A) comprises at least one selected from the group consisting of polyethylene homopolymer, polypropylene homopolymer, ethylene-α-olefin copolymers, propylene-α-olefin copolymers, propylene-ethylene copolymers, and ethylene-α-olefin block interpolymers.

2. The method of claim 1, further comprising drying the coated substrate prior to selectively activating.

3. The method of claim 1, wherein the aqueous dispersion is deposited on the substrate at a temperature below a melting temperature of the polymer.

4. The method of claim 1, wherein selectively activating further comprises applying pressure.

* * * * *